US012766772B1

(12) United States Patent
Dai et al.

(10) Patent No.: US 12,766,772 B1
(45) Date of Patent: Oct. 20, 2026

(54) FILAMENT EXTRUDER

(71) Applicants: Dongguan Imai Intelligent Technology Co., Ltd., Dongguan (CN); Dongguan Songmei New Material Technology Co., Ltd., Dongguan (CN)

(72) Inventors: Jingliang Dai, Dongguan (CN); Zhuo Yang, Dongguan (CN); Zicong Jiang, Dongguan (CN); Jun Zhu, Dongguan (CN)

(73) Assignees: Dongguan Imai Intelligent Technology Co., Ltd., Dongguan (CN); Dongguan Songmei New Material Technology Co., Ltd., Dongguan (CN)

( * ) Notice: Subject to any disclaimer, the term of this patent is extended or adjusted under 35 U.S.C. 154(b) by 17 days.

(21) Appl. No.: 19/415,864

(22) Filed: Dec. 11, 2025

Related U.S. Application Data

(63) Continuation of application No. PCT/CN2025/131470, filed on Oct. 31, 2025.

(30) Foreign Application Priority Data

Oct. 11, 2025 (CN) ......................... 202522158837.5

(51) Int. Cl.
*B29C 48/05* (2019.01)
*B29C 48/28* (2019.01)
*B29C 48/92* (2019.01)

(52) U.S. Cl.
CPC .............. *B29C 48/05* (2019.02); *B29C 48/28* (2019.02); *B29C 48/92* (2019.02); *B29C 2948/92619* (2019.02)

(58) Field of Classification Search
CPC ......... B29C 48/05; B29C 48/28; B29C 48/92; B29C 2948/92619; B29C 64/118; B29C 64/209; B29C 64/321
See application file for complete search history.

(56) References Cited

U.S. PATENT DOCUMENTS

| | | | | |
|---|---|---|---|---|
| 4,093,146 A * | 6/1978 | Haley | B65H 54/28 | 242/548.1 |
| 4,538,773 A * | 9/1985 | McEathron | B65H 54/026 | 242/157 R |

(Continued)

FOREIGN PATENT DOCUMENTS

| | | |
|---|---|---|
| DE | 202016003742 U1 | 7/2016 |
| JP | H0859075 A | 3/1996 |
| JP | H1081447 A | 3/1998 |

OTHER PUBLICATIONS

International Search Report received in corresponding International patent application No. PCT/CN2025/131470, mailed Mar. 13, 2026, 14 pages.

*Primary Examiner* — Nahida Sultana
(74) *Attorney, Agent, or Firm* — Cooper Legal Group, LLC

(57) ABSTRACT

A filament extruder includes a frame, and a feeding assembly, an extrusion assembly, a filament diameter control assembly, and a winding assembly that are arranged on the frame; the feeding assembly includes a hopper; the extrusion assembly includes an extrusion barrel and an extrusion screw inside the extrusion barrel, a bottom of the hopper communicates with an interior of the extrusion barrel, an extrusion motor is drivingly connected to the extrusion screw, the extrusion barrel is provided with an extrusion nozzle and a heating device, the heating device is configured to heat raw materials within the extrusion barrel to be in a molten state, and the extrusion screw is configured to propel the raw materials in the molten state through the extrusion nozzle to form a filament.

8 Claims, 6 Drawing Sheets

(56) References Cited

U.S. PATENT DOCUMENTS

| | | | | |
|---|---|---|---|---|
| 5,589,203 | A * | 12/1996 | Sato | B29B 7/603 366/82 |
| 12,485,619 | B2 * | 12/2025 | Debora | B29C 64/118 |
| 2008/0204707 | A1 * | 8/2008 | Hwang | G01M 11/085 356/35.5 |
| 2016/0236409 | A1 * | 8/2016 | Armani | B29C 64/106 |
| 2018/0369770 | A1 * | 12/2018 | Brzezowsky | B01F 35/213 |
| 2019/0168436 | A1 * | 6/2019 | Wesselink | B29C 48/265 |
| 2019/0204811 | A1 * | 7/2019 | Adair | B29C 64/118 |

* cited by examiner

FILAMENT EXTRUDER

CROSS-REFERENCE TO RELATED APPLICATION

This application is a continuation of PCT application serial no. PCT/CN2025/131470, filed on Oct. 31, 2025, which claims the priority and benefit of Chinese patent application serial no. 202522158837.5, filed on Oct. 11, 2025. The entireties of PCT application serial no. PCT/CN2025/131470 and Chinese patent application serial no. 202522158837.5 are hereby incorporated by reference herein and made a part of this specification.

TECHNICAL FIELD

The present application relates to the technical field of extruders and, in particular, to a filament extruder.

DESCRIPTION OF RELATED ART

As is well known, with the proliferation of 3D printing technology, desktop 3D printers are increasingly adopted in households, offices, and laboratories. 3D printing filaments (made from such as PLA and ABS) serve as an essential material for 3D printing. These materials are typically manufactured in large-scale factories and are rarely available at retail. Therefore, if households, offices, and laboratories wish to obtain small quantities of 3D printing filament, they must explore alternative methods, such as equipping themselves with a desktop filament extruder for small-batch production of 3D printing filament for their own use.

However, due to their simplistic structure and limited functionality, existing desktop filament extruders produce filament that fail to meet the diameter standards. Additionally, filament winding process relies on manual operation, rendering the process cumbersome.

SUMMARY

To address the aforementioned problems, the present application provides a filament extruder.

The filament extruder provided in the present application adopts the following technical solution:

A filament extruder includes a frame, and a feeding assembly, an extrusion assembly, a filament diameter control assembly, and a winding assembly that are arranged on the frame; where the feeding assembly includes a hopper;

the extrusion assembly includes an extrusion barrel and an extrusion screw inside the extrusion barrel, a bottom of the hopper communicates with an interior of the extrusion barrel, an extrusion motor is drivingly connected to the extrusion screw, the extrusion barrel is provided with an extrusion nozzle and a heating device, the heating device is configured to heat raw materials within the extrusion barrel to be in a molten state, and the extrusion screw is configured to propel the raw materials in the molten state through the extrusion nozzle to form a filament;

the filament diameter control assembly includes a pair of rollers, a drive motor configured to drive the pair of rollers to rotate, and a filament diameter sensor configured for detecting a diameter of the filament, and the pair of rollers is configured to grip the filament and drive the filament to move, and the winding assembly includes a filament spool and a reel motor configured to drive the filament spool to rotate.

Optionally, the feeding assembly further includes a low-material sensor, and the low-material sensor is configured to detect whether the hopper is running low on the raw materials.

Optionally, a plurality of heating devices are arranged along an axial direction of the extrusion barrel, where each of the plurality of heating devices is equipped with a temperature measurement device configured to detect a temperature of the a respective one of the plurality of heating devices, and the extrusion nozzle and the hopper are located at opposite ends of the extrusion barrel in the axial direction.

Optionally, the filament extruder further includes a cooling assembly arranged on the frame and configured to cool the filament, where the cooling assembly includes a plurality of fans and a cooling air duct arranged along a movement direction of the filament, the cooling air duct is configured to support the filament for a movement of the filament, and the plurality of fans are positioned beneath the filament moved horizontally.

Optionally, the frame is constructed with an internal space isolated from an external environment, where at least the extrusion nozzle and the cooling air duct are located within the internal space, the fans are configured as intake fans to draw external air into the internal space and direct the external air toward the filament;

the cooling assembly further includes an exhaust fan and a filtration device, the exhaust fan is configured to expel air from the internal space to the external environment, and the filtration device is located in an airflow path created by the exhaust fan and is configured to filter air before the air is discharged to the external environment.

Optionally, the filament diameter sensor is arranged on an infeed side and/or an outfeed side of the pair of rollers, where the filament diameter control assembly further includes a feed guide located on the infeed side of the pair of rollers, and the filament passes through the feed guide before entering the filament diameter control assembly.

Optionally, the pair of rollers includes a stretching roller and an encoder roller, where the drive motor is drivingly connected to the stretching roller.

Optionally, the filament spool is rotationally connected to the frame via a reel shaft, the reel shaft is equipped with an optical grating device, and the optical grating device includes an optical grating assembly and a grating disk.

Optionally, the winding assembly further includes a guide motor, a lead screw, a guide rod, and a guide block slidably connected to the guide rod, where the guide rod is parallel to the lead screw, the guide rod is fixedly connected to the frame, the guide motor is drivingly connected to the guide block via the lead screw to drive the guide block to slide along the guide rod, and a sliding direction of the guide block is parallel to an axial direction of the filament spool.

In conclusion, the present application includes at least one of the following beneficial technical effects:

1. The filament extruder of the present application includes a filament diameter control assembly and a winding assembly. The filament diameter control assembly can detect the filament diameter and adjust it to a standard value, thereby solving the problem of non-compliant filament diameter and ensuring that the produced filament has a uniform and stable diameter.
2. The winding assembly can automatically wind the produced filament into coils, achieving high winding quality.

DESCRIPTION OF THE EMBODIMENTS

Figure 1:
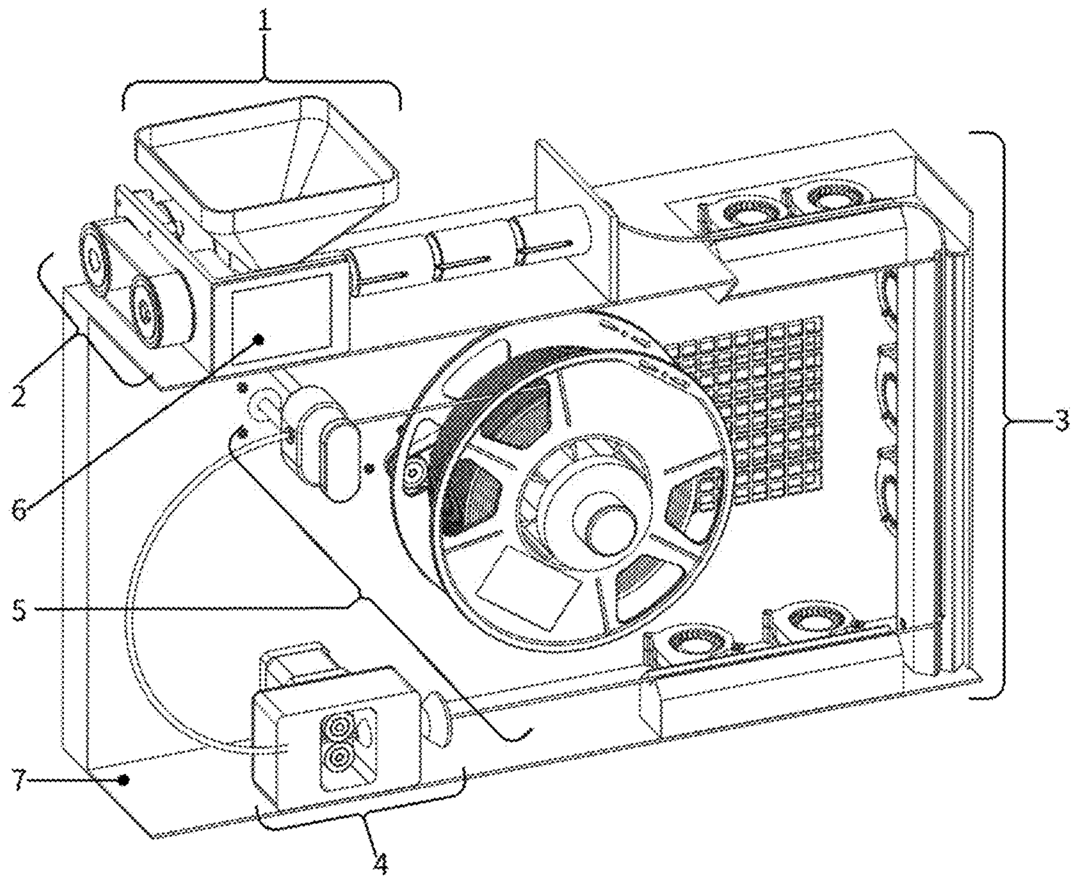
FIG. 1 is a first schematic view of the filament extruder in the present application.

The present application will be described in further detail in combination with FIGS. 1-6.

Referring to FIGS. 1-6, embodiments of the present application disclose a filament extruder. The filament extruder includes a frame 7, and a feeding assembly 1, an extrusion assembly 2, a filament diameter control assembly 4, and a winding assembly 5, which are mounted on the frame 7. The feeding assembly 1 is configured to supply raw materials for the filament 100 to the extrusion assembly 2. The extrusion assembly 2 is configured to heat the raw materials until it melts and extrudes it to form the filament 100. The filament diameter control assembly 4 is configured to regulate the diameter of the filament 100 to ensure it meets the specified requirements. The winding assembly 5 is configured to wind the compliant filament 100 and coil it into a roll, eliminating the need for manual winding and thus saving time and labor.

Furthermore, the filament extruder further includes a main control assembly 6. The main control assembly 6 is positioned on a top of the frame 7 and in front of the extrusion assembly 2, which is configured to control the filament extruder. The main control assembly 6 includes a microprocessor 602 and an interactive screen 601. As the central brain of the filament extruder, the main control assembly 6 is connected via cables to various assemblies, including the feeding assembly 1, an extrusion assembly 2, a cooling assembly 3, a filament diameter control assembly 4, and a winding assembly 5. Equipped with robust data processing and coordinated control capabilities, the main control assembly 6 enables centralized control and real-time monitoring of the entire equipment, ensuring efficient and stable operation of the one-click production function. Upon completion of a production task, the main control assembly 6 records and stores all key data from the production process, such as production time, temperature profiles, filament diameter variations, winding speed, and tension fluctuations, generating a detailed production data file. This data can be used for subsequent production management, quality analysis, and process optimization, assisting users in continuously improving production efficiency and product quality. Additionally, the main control assembly 6 summarizes and evaluates the operational status of the equipment to prepare for next production cycle.

The following provides a detailed description of each assembly.

Figure 2:
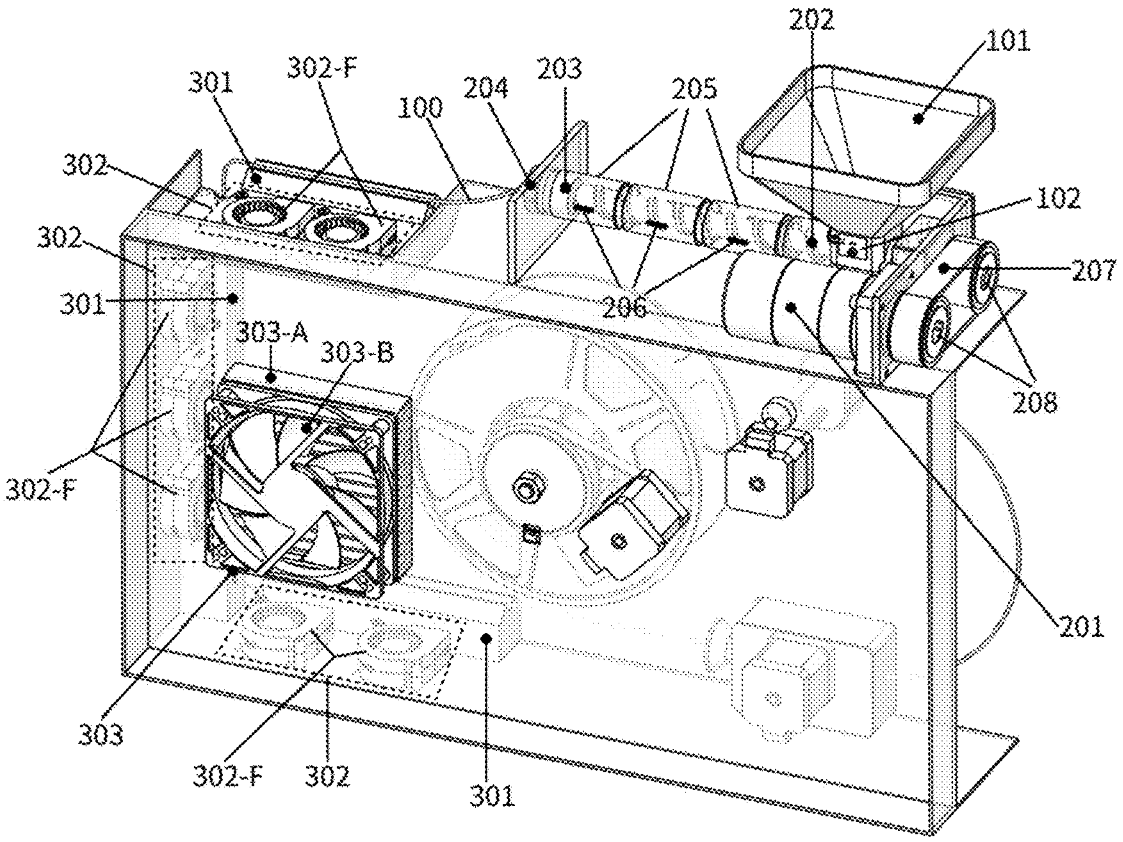
FIG. 2 is a second schematic view of the filament extruder in the present application.

In this embodiment, as shown in FIGS. 1 and 2, the feeding assembly 1 is equipped with a hopper 101, the hopper 101 is arranged on the top of the frame 7. The hopper 101 features a funnel-shaped structure, its larger opening is designed to facilitate the user's addition of production raw materials such as plastic pellets.

Optionally, an inner wall of the hopper 101 is smooth, which effectively reduces friction during the descent of the raw materials and ensures their smooth downward flow. Furthermore, the capacity of the hopper 101 is carefully designed to accommodate the raw material required for a certain period of production, thereby minimizing the need for frequent refilling.

Furthermore, referring to FIG. 2, the feeding assembly 1 is further equipped with a low-material sensor 102 configured to detect whether the hopper 101 is running low on raw materials. As shown in FIG. 2, the low-material sensor 102 is installed at a specific position of the hopper 101, such as near a bottom of the hopper 101. The low-material sensor 102 may monitoring the remaining amount of raw materials in the hopper 101. When the raw materials in the hopper 101 decrease to a set minimum threshold, the low-material sensor 102 immediately detects this condition and transmits a signal to the main control assembly 6 of the filament extruder rapidly. Upon receiving the signal, the main control assembly 6 displays a warning message on its interactive screen 601 and triggers an alert.

Additionally, during the production process, when the low-material sensor 102 detects a material shortage in the hopper 101 and transmits the detection signal to the main control assembly 6, the main control assembly 6 will pause the operation of the filament extruder. Furthermore, to prevent prolonged downtime caused by delayed material replenishment, users may set a time limit may be set after the low-material sensor 102 detects the material shortage. Upon expiration of this time limit, the main control assembly 6 will proceed to halt the filament extruder completely.

It should be noted that the low-material sensor 102 may be any type of sensor capable of detecting the remaining level of raw materials in the hopper 101, such as photoelectric sensors or weight sensors, which is available in the existing technology.

In this embodiment, referring to FIGS. 1 and 2, the extrusion assembly 2 is arranged on the top of the frame 7 and below the feeding assembly 1.

Specifically, as shown in FIG. 2, the extrusion assembly 2 includes an extrusion barrel 202 and an extrusion screw 203 housed within the extrusion barrel 202. The bottom of the hopper 101 communicates with the extrusion barrel 202, allowing raw materials from the hopper 101 to smoothly fall into the extrusion barrel 202.

The extrusion screw 203 is tightly fitted with the extrusion barrel 202 to form an enclosed workspace, enabling the raw materials to be conveyed forward along an inner wall of the extrusion barrel 202 under the propulsion of the extrusion screw 203. The extrusion screw 203 may operate at a stable rotational speed according to the type and parameters of the filament 100 being produced, thereby ensuring superior production quality.

The extrusion screw 203 is driven by an extrusion motor 201. Referring to FIG. 2, the extrusion screw 203 and the extrusion motor 201 are connected via a synchronous belt 207 and a synchronous pulley 208. The transmission mechanism of the synchronous belt 207 and synchronous pulley 208 offers advantages such as high transmission efficiency, smooth operation, and low noise, ensuring that the extrusion screw 203 achieves a stable and precise rotational speed. This guarantees uniform conveying of the raw materials during the extrusion process.

The extrusion motor 201 serves as the power source of the extrusion assembly 2. After activation, the extrusion motor 201 drives the extrusion screw 203 to rotate, thereby propelling the molten raw material through the extrusion nozzle 204 to form the filament 100.

Referring to FIG. 2, the extrusion barrel 202 is equipped with an extrusion nozzle 204 and a heating device 205. The extrusion nozzle 204 and the hopper 101 are located at opposite axial ends of the extrusion barrel 202. The heating device 205 is used to heat the raw materials inside the extrusion barrel 202 to a molten state, and the extrusion screw 203 serves to propel the molten raw materials through the extrusion nozzle 204 to form the filament 100.

The extrusion nozzle 204 is mounted at a discharge end of the extrusion barrel 202. When the molten raw materials, propelled by the extrusion screw 203, reaches the extrusion nozzle 204, the circular channel of the extrusion nozzle 204 shapes the raw materials. The channel of the extrusion nozzle 204 features a precise diameter and a smooth inner wall, enabling uniform extrusion of the raw materials and thereby ensuring precise circularity of the extruded filament 100.

Optionally, a plurality of heating devices 205 are arranged along the axial direction of the extrusion barrel 202. Each heating device 205 is equipped with a temperature measurement device 206 to detect its respective heating temperature. The plurality of heating devices 205 may be independently controlled to achieve different heating temperatures, thereby forming a customized heating temperature profile. This facilitates real-time adjustment of the temperature in each zone, thereby promoting better fusion of the raw materials within the extrusion barrel 202.

In this embodiment, as shown in FIGS. 1 and 2, the filament extruder further includes a cooling assembly 3 arranged on the frame 7 for cooling the filament 100. For instance, the cooling assembly 3 is located to the right of both the frame 7 and the extrusion assembly 2.

Specifically, referring to FIG. 2, the cooling assembly 3 includes a plurality of fans and a cooling air duct 301 arranged along the movement direction of the filament 100. The cooling air duct 301 is configured to support the filament 100, ensuring its stable movement. The plurality of fans are positioned beneath the horizontally moving filament 100. These fans function to cool the filament 100 while simultaneously generating an upward airflow that lifts the filament 100, reducing friction between the filament 100 and the cooling air duct 301, allowing the filament to travel without direct contact with the duct surface of the cooling air duct 301.

Optionally, the frame 7 is constructed with an internal space isolated from the external environment, with at least the extrusion nozzle 204 and the cooling air duct 301 located within this internal space. Certainly, in other embodiments, the entire extrusion assembly 2, filament diameter control assembly 4, and winding assembly 5 may also be arranged within the internal space, as shown in FIGS. 1 and 2.

When the frame 7 is constructed with an internal space isolated from the external environment, the fans are configured as intake fans 302-F, to drive external air into the internal space and direct it toward the filament 100, providing air cooling for the filament 100. In this configuration, the cooling assembly 3 further includes a filtration and circulation device 303. This filtration and circulation device 303 includes an exhaust fan 303-B and a filtration device 303-A, as shown in FIG. 2. The exhaust fan 303-B is configured to expel air from the internal space to the external environment. Since the air within the internal space is at a higher temperature, expelling this warmer air from the internal space to the outside, in coordination with the intake fans 302-F which draws external air into the internal space, establishes an air circulation system. This enhances heat dissipation from the filament 100, resulting in high cooling efficiency.

Furthermore, referring to FIG. 2, the filtration device 303-A is positioned in the airflow path created by the exhaust fan 303-B and is configured to filter the air before it is discharged to the external environment. During the production process, the filament 100 may generate pungent gases, or specific materials might produce toxic gases, which mix with the air in the internal space. The filtration and circulation device 303 can filter out these gases, preventing environmental pollution from the discharged air.

In specific implementation, the cooling air duct 301 converges the airflow delivered by the intake fans 302-F to evenly dissipate heat from the filament 100. Referring to FIG. 2, there is a height difference between the discharge position of the extrusion nozzle 204 and the uppermost end of the cooling air duct 301. This height difference allows the freshly extruded filament 100 from the extrusion nozzle 204 to enter the cooling air duct 301 along a gentle, curved path, which helps reduce the resistance and friction acting on the filament 100, preserving the quality of the filament 100.

Referring to FIG. 2, the plurality of intake fans 302-F form a cooling fan assembly 302. Each intake fan 302-F can function as an independent cooling zone controlled by the main control assembly 6, collectively establishing a cooling profile. Based on the type and parameters of the material currently being produced, the main control assembly 6 individually adjusts the airflow speed of each intake fan 302-F in their respective cooling zones. This enables precise control over the cooling rate of the material at specific locations and during specific time intervals, thereby achieving an optimal cooling effect.

Figure 3:
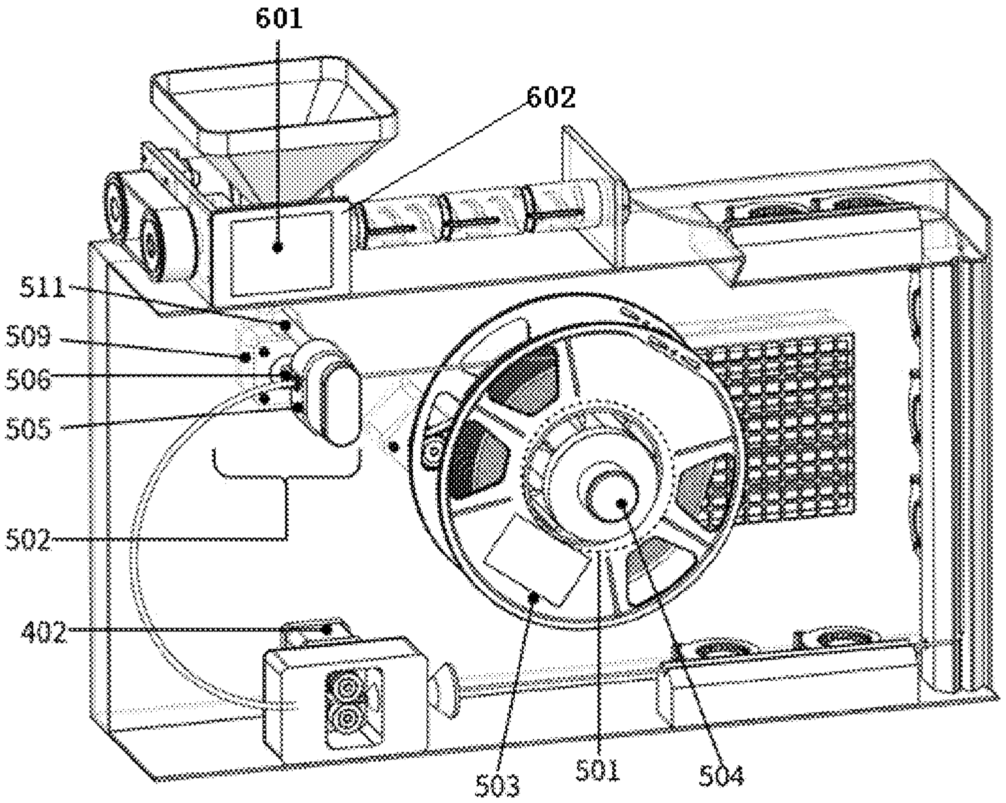
FIG. 3 is a third schematic view of the filament extruder in the present application.
Figure 4:
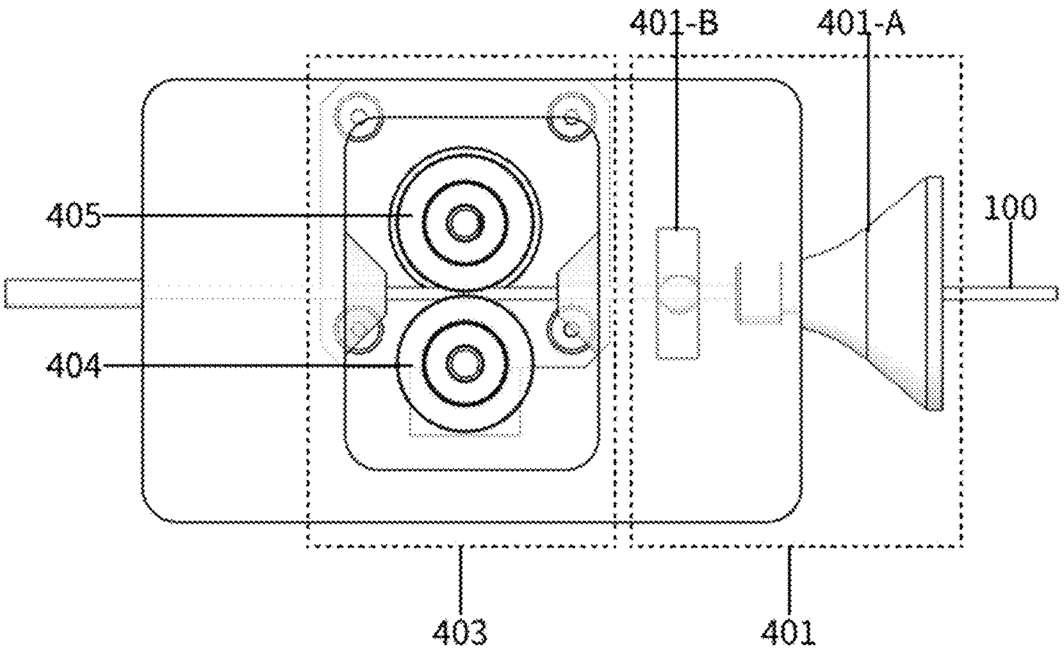
FIG. 4 is a schematic view of the filament diameter control assembly in the present application.

In this embodiment, referring to FIGS. 3 and 4, the filament diameter control assembly 4 is arranged at the lower left side of the frame 7. The filament diameter control assembly 4 includes a pair of rollers, a drive motor 402 configured to rotate the pair of rollers, and a filament diameter sensor 401-B configured to detect the diameter of the filament 100. The pair of rollers is used to grip the filament 100 and drive it to move. By gripping and pulling the filament 100, the pair of rollers adjusts the thickness of the filament 100, thereby calibrating the diameter of the filament 100 to a standard value. This mechanism solves the problem of non-compliant filament thickness and ensures the produced filament 100 has a consistent and stable diameter.

Optionally, the filament diameter sensor 401-B is arranged on an infeed side and/or an outfeed side of the pair of rollers. The filament diameter sensor 401-B on the infeed side is used to detect the diameter of the filament 100 entering the filament diameter control assembly 4 to determine whether adjustment of the diameter of the filament 100 is required, while the filament diameter sensor 401-B on the outfeed side is used to detect whether the diameter of the filament 100 has been adjusted to the target value.

Furthermore, referring to FIG. 4, the filament diameter control assembly 4 further includes a feed guide 401-A located on the infeed side of the pair of rollers. The filament 100 passes through the feed guide 401-A before entering the filament diameter control assembly 4. The funnel-shaped design of the feed guide 401-A serves to minimize the deviation of the filament 100 when entering the filament diameter control assembly 4, thus ensuring measurement accuracy.

Optionally, the pair of rollers consists of a stretching roller 405 and an encoder roller 404. The drive motor 402 is mechanically connected to the stretching roller 405, thereby allowing the encoder roller 404 to measure the length of the filament 100 passing through the filament diameter control assembly 4.

Referring to FIG. 4, the filament diameter control assembly 4 includes a filament diameter measurement device 401 and a filament diameter adjustment device 403. The filament diameter measurement device 401 includes the feed guide 401-A and the filament diameter sensor 401-B. The filament diameter adjustment device 403 includes the drive motor 402, the stretching roller 405, and the encoder roller 404. The main control assembly 6 can adjust the rotational speed of the drive motor 402 in real time based on the filament diameter data fed back from the filament diameter sensor 401-B, thereby calibrating the diameter of the filament 100 to a preset value by increasing or decreasing the speed of the stretching roller 405.

For instance, the filament 100 extruded from the extrusion nozzle 204 reaches a suitable temperature after undergoing preliminary cooling in the cooling assembly 3. The filament 100 is then fed into the filament diameter measurement device 401, where the filament diameter sensor 401-B detects the diameter of the filament 100 in real time and transmits the measurement data to the main control assembly 6. The main control assembly 6 compares and analyzes the actually measured diameter data with the required target diameter. If the actual diameter is greater than the target diameter, the main control assembly 6 issues a command to increase the rotational speed of the stretching roller 405 on the filament diameter adjustment device 403, thereby applying greater tensile force to the filament 100 until the diameter is calibrated to the preset standard. Conversely, if the actual diameter is smaller than the target diameter, the rotational speed of the stretching roller 405 is reduced to decrease the tensile force. The filament diameter sensor 401-B, working in tandem with the main control assembly 6, enables real-time automatic detection, adjustment, and control of the filament diameter, ensuring that the produced filament 100 has a uniform and stable diameter. Additionally, the encoder roller 404 on the filament diameter adjustment device 403 can accurately calculate the length of the produced filament 100 through its rotations, thereby determining the production progress.

In this embodiment, referring to FIG. 3, the winding assembly 5 is arranged in the center section of the frame 7. The winding assembly 5 includes a filament spool 503 and a reel motor 510 that drives the filament spool 503 to rotate. The reel motor 510 drives the filament spool 503 to rotate, thereby winding the filament 100 onto the filament spool 503 to complete the coiling and collection process.

Figure 5:
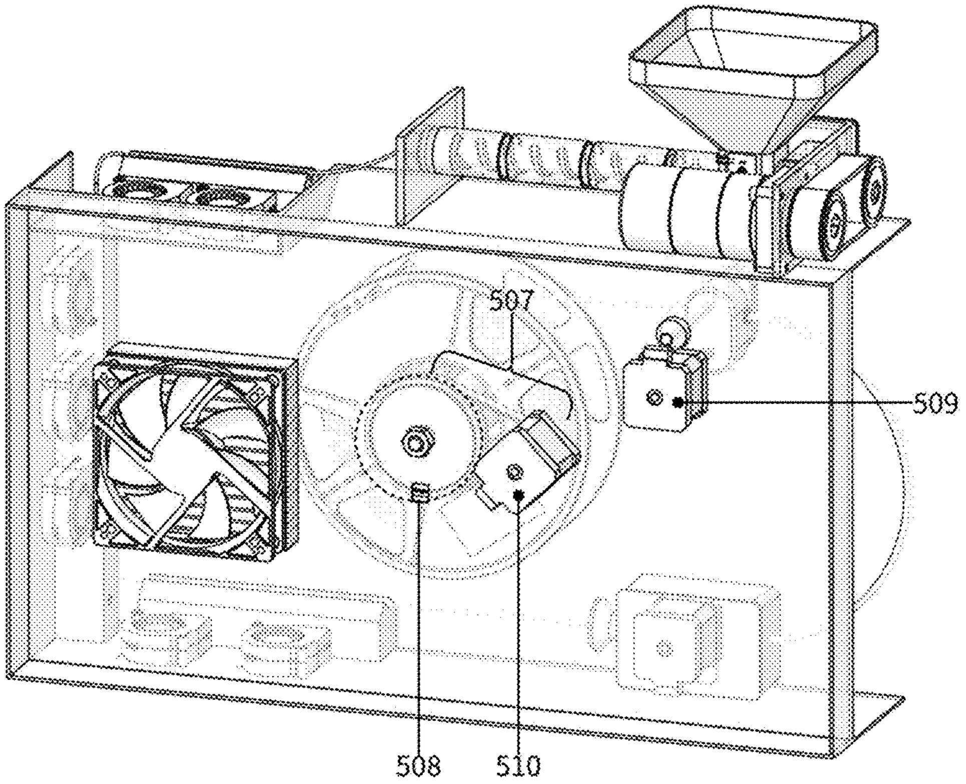
FIG. 5 is a fourth schematic view of the filament extruder in the present application.
Figure 6:
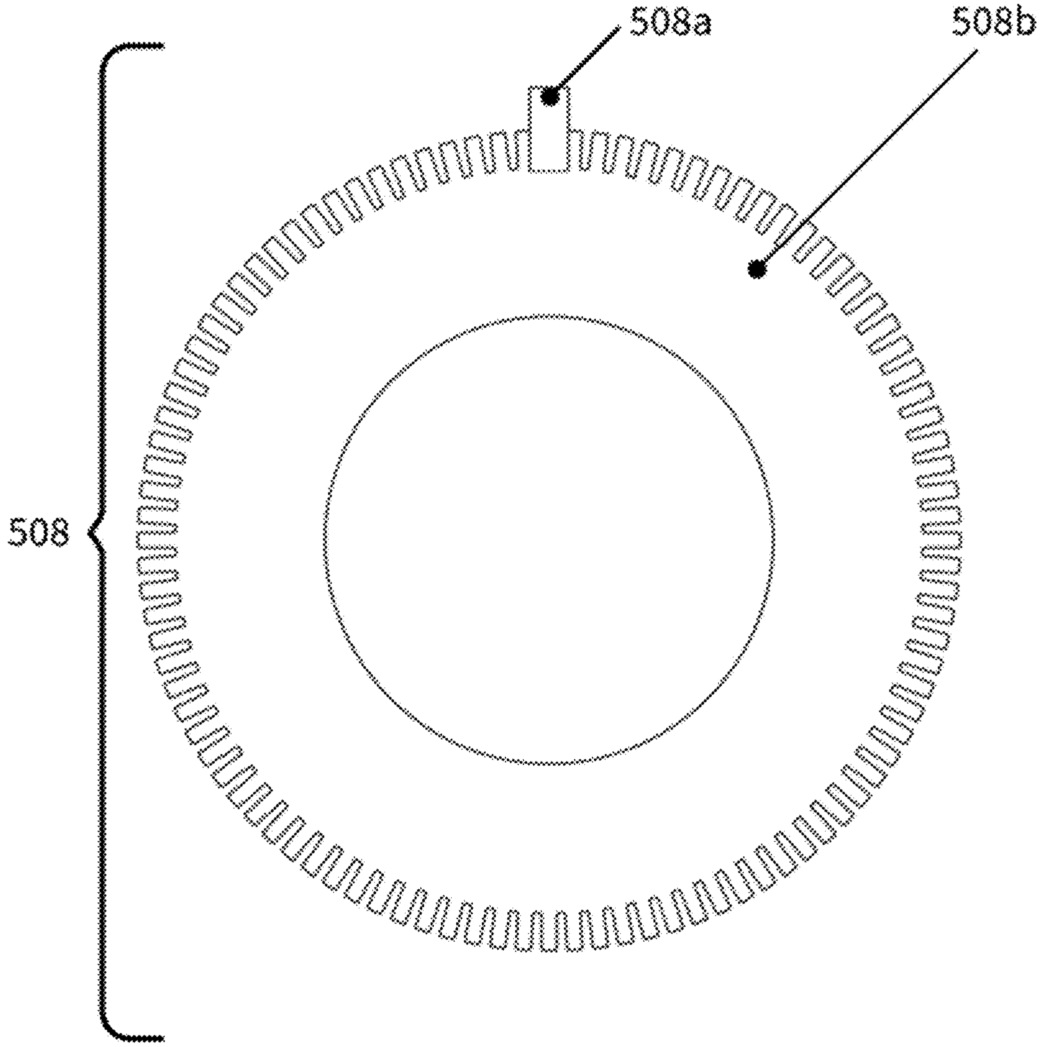
FIG. 6 is a schematic view of the grating wheel device in the present application.

Optionally, referring to FIGS. 3 and 5, the filament spool 503 is rotationally connected to the frame 7 via a reel shaft 504. Referring to FIGS. 5 and 6, the reel shaft 504 is equipped with an optical grating device 508. The optical grating device 508 includes an optical grating assembly 508*a* and a grating disk 508*b*. The grating disk 508*b* rotates synchronously with the reel shaft 504, and the optical grating assembly 508*a* is fixed in position to detect the rotation angle of the grating disk 508*b*, thereby acquiring the rotation angle of the filament spool 503.

Furthermore, referring to FIGS. 3 and 5, the winding assembly 5 further includes a filament guide device 502. The filament guide device 502 includes a guide motor 509, a lead screw 506, a guide rod 511, and a guide block 505 slidably connected to the guide rod 511. The guide rod 511 is parallel to the lead screw 506 and the guide rod 511 is fixedly connected to the frame 7. The guide motor 509 is drivingly connected to the guide block 505 via the lead screw 506 to drive the guide block 505 to slide along the guide rod 511. The sliding direction of the guide block 505 is parallel to the axial direction of the filament spool 503, thereby enabling the filament 100 to be evenly wound onto the filament spool 503 and improving the coiling quality.

In specific implementation, referring to FIG. 3, the winding assembly 5 includes a reel shaft assembly 501. The reel shaft assembly 501 includes the reel shaft 504, the reel motor 510, and a high-precision optical grating device 508. The reel shaft 504 is configured to secure the filament spool 503. The reel motor 510 provides power for the rotation of the reel shaft 504 and is capable of precisely adjusting its rotational speed. The high-precision optical grating device 508 is mounted on the reel shaft 504. When the reel shaft 504 rotates, the grating disk 508*b* rotates simultaneously, thereby intermittently interrupting the optical grating assembly 508*a*. This enables precise detection of the rotation angle and number of revolutions of the reel shaft 504, which is then fed back to the main control assembly 6. The main control assembly 6 calculates the required travel distance for the guide block 505 based on the feedback data and sends this distance command to the guide motor 509. The guide motor 509 then drives the guide block 505 to move accordingly, thereby achieving neat and orderly winding of the filament 100 onto the filament spool 503 and ensuring high-quality coiling.

The filament diameter control assembly 4, the reel shaft assembly 501, and the filament guide device 502 are all controlled by the main control assembly 6 to form a closed-loop system. This enables the dynamic adjustment of their operating states based on production speed and the storage status of the filament 100. For example, when the filament 100 enters the filament diameter control assembly 4, the filament diameter measurement device 401 detects the diameter of the filament 100 in real time and transmits the measurement data to the main control assembly 6. The main control assembly 6 compares and analyzes the actually measured diameter data with the target diameter, and then, based on the comparison difference, controls the stretching roller 405 on the filament diameter adjustment device 403 in real time to increase or decrease its rotational speed, so as to adjust the tensile force applied to the filament 100, thereby bringing its diameter to the preset standard. The filament 100 then enters the filament guide device 502 and subsequently the reel shaft assembly 501. The main control assembly 6 controls the reel motor 510 to drive the reel shaft 504 to rotate. The optical grating assembly 508*a* on the high-precision optical grating device 508 detects this rotation and provides feedback to the main control assembly 6. Based on the feedback data, the main control assembly 6 calculates the required travel distance for the guide block 505 and sends it to the guide motor 509, which in turn drives the guide block 505 to move. This enables precise filament laying, achieving neat and orderly winding of the filament 100 onto the filament spool 503.

In the main control assembly 6, the linear speed of the stretching roller 405 is set to be lower than that of the filament spool 503. This ensures that the filament 100 remains in a taut state during winding, preventing loosening or tangling. Furthermore, the speed difference is maintained within a minimal range to avoid affecting the diameter of the filament 100.

When the filament 100 on the filament spool 503 is about to reach the production target, that is, when the length of the filament 100 measured by the encoder roller 404 of the filament diameter control assembly 4 reaches the pre-calculated length required for production based on preset material and weight data, the main control assembly 6 will issue a command to stop the extrusion assembly and other related component, to complete the production task.

LIST OF REFERENCE SIGNS

1 feeding assembly
101 hopper
102 low-material sensor
2 extrusion assembly
201 extrusion motor
202 extrusion barrel
203 extrusion screw
204 extrusion nozzle
205 heating device
206 temperature measurement device
207 synchronous belt
208 synchronous pulley
3 cooling assembly
301 cooling air duct
302 cooling fan assembly
302-F intake fan
303 filtration and circulation device
303-A filtration device
303-B exhaust fan
4 filament diameter control assembly
401 filament diameter measurement device
401-A feed guide
401-B filament diameter sensor
402 drive motor
403 filament diameter adjustment device
404 encoder roller
405 stretching roller
5 winding assembly
501 reel shaft assembly
502 filament guide device
503 filament spool
504 reel shaft
505 guide block
506 lead screw
507 transmission assembly
508 optical grating device
508 optical grating assembly
508*b* grating disk
509 guide motor
510 reel motor
511 guide rod
6 main control assembly
601 interactive screen
602 microprocessor
7 frame
100 filament

What is claimed is:

1. A filament extruder, comprising a frame, and a feeding assembly, an extrusion assembly, a filament diameter control assembly, and a winding assembly that are arranged on the frame;

wherein the feeding assembly comprises a hopper;

the extrusion assembly comprises an extrusion barrel and an extrusion screw inside the extrusion barrel, a bottom of the hopper communicates with an interior of the extrusion barrel, an extrusion motor is drivingly connected to the extrusion screw, the extrusion barrel is provided with an extrusion nozzle and a heating device, the heating device is configured to heat raw materials within the extrusion barrel to be in a molten state, and the extrusion screw is configured to propel the raw materials in the molten state through the extrusion nozzle to form a filament;

the filament diameter control assembly comprises a pair of rollers, a drive motor configured to drive the pair of rollers to rotate, and a filament diameter sensor configured for detecting a diameter of the filament, and the pair of rollers is configured to grip the filament and drive the filament to move;

the winding assembly comprises a filament spool and a reel motor configured to drive the filament spool to rotate;

the filament extruder further comprises a cooling assembly arranged on the frame and configured to cool the filament;

the cooling assembly comprises a plurality of fans and a cooling air duct arranged along a movement direction of the filament, the cooling air duct is configured to support the filament for a movement of the filament, and the plurality of fans are positioned beneath the filament moved horizontally; and the filament extruder further comprises a main control assembly, the main control assembly comprises a microprocessor and an interactive screen, the main control assembly is configured as a central brain of the filament extruder, and the main control assembly is connected via cables to the feeding assembly, the extrusion assembly, the cooling assembly, the filament diameter control assembly, and the winding assembly.

2. The filament extruder according to claim 1, wherein the feeding assembly further comprises a low-material sensor, and the low-material sensor is configured to detect whether the hopper is running low on the raw materials.

3. The filament extruder according to claim 1, wherein a plurality of heating devices are arranged along an axial direction of the extrusion barrel, and each of the plurality of heating devices is equipped with a temperature measurement device configured to detect a temperature of a respective one of the plurality of heating devices, and the extrusion nozzle and the hopper are located at opposite ends of the extrusion barrel in the axial direction.

4. The filament extruder according to claim 1, wherein the frame is constructed with an internal space isolated from an external environment, and at least the extrusion nozzle and the cooling air duct are located within the internal space, the plurality of fans are configured as intake fans to draw external air into the internal space and direct the external air toward the filament;

the cooling assembly further comprises an exhaust fan and a filtration device, the exhaust fan is configured to expel air from the internal space to the external environment, and the filtration device is located in an airflow path created by the exhaust fan and is configured to filter air before the air is discharged to the external environment.

5. The filament extruder according to claim 1, wherein the filament diameter sensor is arranged on at least one of an infeed side or an outfeed side of the pair of rollers, the filament diameter control assembly further comprises a feed guide located on the infeed side of the pair of rollers, and the filament passes through the feed guide before entering the filament diameter control assembly.

6. The filament extruder according to claim 1, wherein the pair of rollers comprises a stretching roller and an encoder roller, and the drive motor is drivingly connected to the stretching roller.

7. The filament extruder according to claim 1, wherein the filament spool is rotationally connected to the frame via a reel shaft, the reel shaft is equipped with an optical grating device, and the optical grating device comprises an optical grating assembly and a grating disk.

8. The filament extruder according to claim 1, wherein the winding assembly further comprises a guide motor, a lead screw, a guide rod, and a guide block slidably connected to the guide rod, the guide rod is parallel to the lead screw, the guide rod is fixedly connected to the frame, the guide motor is drivingly connected to the guide block via the lead screw to drive the guide block to slide along the guide rod, and a sliding direction of the guide block is parallel to an axial direction of the filament spool.

* * * * *